United States Patent
Kaeufler et al.

(10) Patent No.: US 9,702,027 B2
(45) Date of Patent: *Jul. 11, 2017

(54) COPPER ALLOY

(75) Inventors: Andrea Kaeufler, Neu-Ulm (DE); Jochen Aufrecht, Neu-Ulm (DE)

(73) Assignee: WIELAND-WERKE AG, Ulm (DE)

( * ) Notice: Subject to any disclaimer, the term of this patent is extended or adjusted under 35 U.S.C. 154(b) by 255 days.

This patent is subject to a terminal disclaimer.

(21) Appl. No.: 14/234,840

(22) PCT Filed: Jun. 15, 2012

(86) PCT No.: PCT/EP2012/002524
§ 371 (c)(1),
(2), (4) Date: Jan. 24, 2014

(87) PCT Pub. No.: WO2013/023718
PCT Pub. Date: Feb. 21, 2013

(65) Prior Publication Data
US 2014/0170016 A1   Jun. 19, 2014

(30) Foreign Application Priority Data

Aug. 13, 2011 (DE) .......... 10 2011 110 589
Feb. 8, 2012 (DE) .......... 10 2012 002 450

(51) Int. Cl.
*C22C 9/04* (2006.01)
*C22C 1/10* (2006.01)
*A01K 75/00* (2006.01)
*A01K 61/60* (2017.01)

(52) U.S. Cl.
CPC .......... *C22C 9/04* (2013.01); *A01K 61/60* (2017.01); *A01K 75/00* (2013.01); *C22C 1/10* (2013.01)

(58) Field of Classification Search
CPC .. C22C 9/04; C22C 1/00; A01K 75/00; A01K 61/60
USPC .......... 420/472, 473, 477, 478, 479, 481
See application file for complete search history.

(56) References Cited

U.S. PATENT DOCUMENTS

| | | | |
|---|---|---|---|
| 3,816,109 A | 6/1974 | Crane et al. | |
| 5,893,953 A * | 4/1999 | Bhargava | 148/685 |
| 6,132,528 A | 10/2000 | Brauer et al. | |
| 6,627,011 B2 * | 9/2003 | Sugawara | C22C 9/04 148/682 |
| 2001/0001400 A1* | 5/2001 | Brauer et al. | 148/433 |
| 2005/0039827 A1* | 2/2005 | Yamagishi et al. | 148/554 |
| 2008/0216759 A1* | 9/2008 | Oishi | 119/223 |
| 2009/0260727 A1 | 10/2009 | Oishi | |
| 2014/0377127 A9* | 12/2014 | Kuhn et al. | 420/472 |

FOREIGN PATENT DOCUMENTS

| | | |
|---|---|---|
| DE | 23 53 238 B1 | 10/1973 |
| DE | 42 33 668 A1 | 5/1993 |
| EP | 1 290 234 B1 | 6/2006 |
| EP | 1 777 311 A1 | 4/2007 |
| GB | 1 437 056 | 5/1976 |
| JP | 10-152735 A | 6/1998 |
| JP | 2005-60773 A | 3/2005 |

OTHER PUBLICATIONS

English Translation of International Search Report issued in PCT/EP2012/002524, with a mailing date of Jul. 12, 2013 (2 pages).
German Patent Office Action dated Jul. 21, 2016 for corresponding application No. 10 2012 002 450.9 (6 pgs).

* cited by examiner

*Primary Examiner* — Keith Walker
*Assistant Examiner* — John Hevey
(74) *Attorney, Agent, or Firm* — Flynn, Thiel, Boutell & Tanis, P.C.

(57) ABSTRACT

The invention relates to a copper alloy, composed of (in wt %): 51.8 to 84.0% Cu, 15.5 to 36.0% Zn, 0.35 to 3.0% Sn, 0.12 to 1.5% Fe, 0.02 to 1.0% P, optionally also 0.1 to 2.0% Al, optionally also 0.05 to 0.7% Si, optionally also 0.05 to 2.0% Ni, optionally also respectively 0.1 to 1.0% Mn, Co, optionally also respectively 0.01 to 1.0% As, Sb, and unavoidable contaminants, wherein more than 95% of the structure consist of α-mixed crystal, in which at least iron phosphides and/or iron are embedded as deposition particles, which can be used for metallic articles in breeding organisms living in seawater.

10 Claims, No Drawings

COPPER ALLOY

FIELD OF THE INVENTION

The invention relates to a copper alloy.

DESCRIPTION OF RELATED ART

In maritime fish farming, coated or uncoated polymer nets and also steel cages are currently used. A principal problem is represented by the fouling of the nets by microorganisms and macroorganisms, so-called biofouling. Further requirements for materials which are used for the production of net cages for aquaculture are good chemical resistance in seawater and high mechanical strength, to be able to resist short-term load spikes, for example, due to the impact of flotsam or an attack of predators.

A significant refinement of existing solutions only occurs when numerous requirements for the material are fulfilled simultaneously. Copper-based alloys have in principle a great potential for meeting the requirements with respect to a chemical attack, fouling by microorganisms and macroorganisms (biofouling), and mechanical stress at the same time. For some years, they have also been tested in experimental facilities. Experiences have already been conducted using a tin-containing high-strength brass. This alloy is described in greater detail, for example, in the document EP 1 777 311 A1. In addition, the copper-nickel alloy CuNi10Fe1Mn and silicon bronzes are used.

Alloys made of the group of the so-called Admiralty brasses are particularly suitable for use in seawater. These are also Cu-Zn alloys, the corrosion resistance of which in seawater is improved by adding Sn and an element from the group of As, P, or Sb. Examples are the alloys C44300, C44400, and C44500.

Furthermore, a copper alloy is additionally known from the document EP 1 290 234 B1, which already discloses, for the electronics industry, a more cost-effective alternative to otherwise conventional copper alloys, having high electrical conductivity, high tensile strength, and high shaping strength. The alloy consists of 13 to 15% zinc, 0.7 to 0.9% tin, 0.7 to 0.9% iron, and a residual balance of copper. As a result of the zinc, having a comparatively low metal value currently on the market, costs can be saved in the base material.

A copper alloy is also known from the patent specification U.S. Pat. No. 3,816,109, which has a zinc proportion of at most 15.0%. The iron content is between 1.0 and 2.0%. Using this composition, a comparatively good electrical conductivity for electronic applications is achieved in conjunction with sufficient tensile strength.

Furthermore, copper-tin-iron-zinc alloys are known from the patent specification U.S. Pat. No. 6,132,528, which have a higher zinc content of up to 35.0%. The iron proportion is between 1.6 and 4.0%. The addition of iron has the function of achieving grain refinement already after the casting.

OBJECT OF THE INVENTION

The invention is based on the object of providing particularly suitable alloys for maritime fish farming.

SUMMARY OF THE INVENTION

The invention includes the technical teaching of a copper alloy, consisting of (in wt.-%):

51.8 to 84.0% Cu,
15.5 to 36.0% Zn,
0.35 to 3.0% Sn,
0.12 to 1.5% Fe,
0.02 to 1.0% P,
optionally also 0.1 to 2.0% Al,
optionally also 0.05 to 0.7% Si,
optionally also 0.05 to 2.0% Ni,
optionally respectively also 0.1 to 1.0% Mn, Co,
optionally respectively also 0.01 to 1.0% As, Sb,
and unavoidable impurities, wherein the microstructure consists of more than 95% of α-mixed crystal, in which at least iron phosphides and/or iron are intercalated as precipitation particles, for metal objects in the cultivation of organisms living in seawater.

DETAILED DESCRIPTION OF THE INVENTION

The invention proceeds from the consideration that the cultivation relates in particular to fish and also crustaceans and mussels. So-called aquaculture is performed for this purpose, using which controlled cultivation of aquatic organisms in the ocean is pursued. It is mostly based on net cages in the ocean, in which, for example, salmon or other food fish are raised.

The zinc content between 15.5 and 32.0% in the alloy is selected in particular according to the criterion that an easily formable, single-phase alloy is obtained. The single-phase base microstructure consists of alpha phase. The base microstructure must also be suitable for absorbing the finest possible precipitants of other elements. For zinc contents between 32.0% and 36.0%, up to a certain degree, a further β-phase can also occur, which can be reduced by a temperature treatment, however. The zinc content is not to exceed 36.0%, since otherwise a less favorable phase composition results in the alloy. In particular, in the case of zinc contents exceeding the specified value, the brittle gamma phase occurs, which is undesirable in this context. On the other hand, extensive experimental results of an alloy variant having well over 30.0% zinc show that the desired properties are still ensured. One important property of the alloy is its resistance against corrosion attack and good processing ability. On the other hand, economic aspects are also to be mentioned in the solution according to the invention. Thus, the element zinc can currently still be acquired on the market at a reasonable price and is available in sufficient amounts, to thus produce alloys which are less expensive in the metal price, the properties of which at least extend to those of heretofore known alloys. Thus, the alloys according to the invention have a lower metal value than conventional copper-nickel alloys or silicon bronzes. The material properties are also to be oriented to these alloys.

A higher tin content in the alloy according to the invention has effects on the strength and corrosion resistance from a technical aspect. On the other hand, the tin content is not to exceed 3.0%, since the bending ability is negatively influenced thereby. In principle, the tin concentration is to be kept as low as possible, however, no substantial influence on the alloy properties can still be expected at a proportion less than 0.3%.

By adding suitable proportions of Fe and P, phosphides in the form of precipitation particles can be formed in Cu—Zn—Sn alloys. These are either iron phosphides or mixed phosphides in this case, for example, phosphides containing manganese, nickel, or cobalt. Copper phosphides can also be provided. In addition, iron particles can also precipitate in the alloy matrix.

Iron is responsible for the formation of precipitation particles and therefore for an improvement of the strength properties in comparison to typical Admiralty brasses. The precipitation formation can be controlled and optimized during the manufacturing process. In particular, precipitants form in this alloy during a hot forming step and the following cooling. The tempering mechanisms which are active in the alloy are primarily borne by the element iron. The ferrous particles present in the alloy matrix preferably form in the submicrometer range.

To ensure the dezincification resistance of the alloy, it is significant not to select the ratio of the phosphorus content to the iron content to be excessively low, since otherwise all of the phosphorus dissolved in the α-mixed crystal, which acts as a dezincification inhibitor, is bound in the form of iron phosphides. Its dezincification inhibiting effect is no longer provided in this form. It has been shown that in the testing for dezincification resistance, alloys have proven to be resistant in which, for the ratio P/Fe: [P]/[Fe]>0.25.

The elements As and Sb, which have a dezincification inhibiting effect, are also suitable as selected elements. Furthermore, it is envisaged that As and Sb also form compounds with Fe, which can be used for the particle tempering of a Cu-Zn-based alloy having an α-mixed crystal structure. Furthermore, it is envisaged that Co, Mn, and Ni can form such compounds with P, As, and Sb. A certain proportion of Al, Mn, Ni, and Si can also increase the corrosion resistance of the Cu-based alloys in seawater.

In the case of the alloy according to the invention, particular weight is laid on the microstructure thereof, which is based on a suitable combination of different rolling, pressing, or also drawing processes. Such forming steps can be, on the one hand, hot forming processes in conjunction with further cold forming steps and intermediate annealing steps. The implementation of the alloy according to the invention must be adapted with regard to process technology precisely to the formation of the finely distributed ferrous particles in conjunction with the respective degrees of forming. The optimum of the expected property combinations can only thus be achieved.

A special advantage of the solution according to the invention results from a significant improvement in relation to the previously existing solutions, wherein multiple requirements for the material are fulfilled simultaneously:

corrosion resistance in seawater, brackish water, or freshwater;

resistance to fouling under water (biofouling);

high tensile strength, to bear the intrinsic weight of the meshes or gratings and to be able to fend off attacks of marine predators;

fatigue resistance against the cyclic stress by waves or currents;

high wear resistance, if meshes are used in which a relative movement between the individual wires is possible.

As a result of the particles, the alloy has a higher strength due to precipitation annealing in conjunction with grain refinement, with similar seawater resistance. Therefore, wires and metal strips made of this alloy can be used as a starting material for the use for producing cages for employment in aquacultures, which have a higher strength than conventional Admiralty brasses.

The possibility results therefrom of producing cages of greater stability and longer service life, or alternatively of reducing the wire diameter or the strip thickness, to save material. In particular, the increased strength is already provided in the soft-annealed state, which is particularly favorable for processing steps, for example, for mesh production. The hard phosphide particles additionally increase the wear resistance of the alloy.

The content of iron can advantageously be from 0.55 to 1.5%. In a further preferred embodiment of the invention, the content of tin can be 0.7 to 1.5% and that of iron can be 0.55 to 0.7%. A lower tin content in the specified boundaries is therefore particularly advantageous, because in this way the bending ability of the alloy is primarily improved further. The specified iron content is selected such that particularly fine ferrous particles can form in the alloy matrix. However, these particles still have the size to substantially improve the mechanical properties.

The zinc content can advantageously be between 21.5 and 36.0%. In particular, in this range it is still ensured that the desired alloy, predominantly consisting of alpha phase, can be produced. Such alloys are formable more easily and are still suitable for fine precipitation distribution of the ferrous particles. Furthermore, the zinc content can advantageously be between 26.5 and 35.0%. For a use according to the invention, in addition to the broader specification of the alloy composition, in particular the copper-zinc alloy CuZn28Sn1Fe0.25P0.2, or also CuZn34Sn1Fe0.25P0.2, have proven to be particularly suitable as the selected alloy. This primarily relates to strip, wire, or tubular material having the main components copper, zinc, tin, iron, and phosphorus.

Advantageously, for the ratio of the content of P, As, Sb and the content of Fe, Ni, Mn, Co, the following can apply: [P+As+Sb]/[Fe+Ni+Mn+Co]>0.25. The further elements optionally contained in the alloy can also cause, with regard to the process control, a further property improvement of the alloy or can also display its effect during the production process in the molten phase. In particular the dezincification resistance is ensured by maintaining the specified ratio. A further key property is the bending ability in strips and wires, which improves in particular at higher zinc contents. The experimental results have shown that approximately equally good corrosion resistance of the alloy is present both for low zinc contents and also for high zinc contents. It is essential that in the alloy according to the invention, the tensile strength is significantly improved in relation to the typical brasses.

The mean grain size of the alloy matrix can advantageously be less than 20 μm. By way of the combination of the grain size of the alloy matrix in conjunction with the size of the finely distributed ferrous particles and the distribution thereof, an optimum of the alloy properties may be achieved with regard to the mechanical carrying capacity and bending ability thereof.

In a preferred embodiment, a use for nets, fabric, meshes, and gratings can be envisaged, which are produced from wires or from metal strips.

In a further preferred embodiment, rods, profiles, or profile tubes can be used for fastening or stabilization.

Tubes or hollow profiles can advantageously be used, which are used as fastening elements, floats, or supply lines and disposal lines.

The properties of samples made of these alloys are described hereafter (Table 1). The samples were produced by melting the alloy components in a graphite crucible according to the Tammann method and subsequent casting in cuboid steel ingot molds. The blocks obtained were milled to 22 mm and hot rolled to 12 mm. Subsequently, strip material of the final thickness 1.0 mm was produced by cold rolling, optionally with intermediate annealing. The produced samples were subjected to various tests, which are to prove the particular suitability of the alloy according to the invention.

TABLE 1 chemical composition of the examples and comparative examples [in wt.-%]

|  | Comparative example 1 CuZn28Sn1P0.02 | Comparative example 2 CuZn30Sn1Fe0.6P0.02 | Example 1 CuZn28Sn1Fe0.25P0.2 | Example 2 CuZn23.5Sn1Fe0.6P0.2 |
|---|---|---|---|---|
| Cu | 71.20 | 68.35 | 70.57 | 74.77 |
| Zn | 27.57 | 30.05 | 27.92 | 23.45 |
| Sn | 1.20 | 1.02 | 1.05 | 1.04 |
| Fe | 0.00 | 0.55 | 0.24 | 0.59 |
| P | 0.02 | 0.02 | 0.22 | 0.19 |

Table 2 shows the mechanical properties of the particle-annealed alloy according to example 1 in comparison to the particle-free alloy according to comparative example 1 (alloy C44500, prior art). Both samples were provided in 100% recrystallized state, which was implemented by an annealing treatment at a temperature of 500° C. for the duration of 3 hours after the last cold rolling step. This state is particularly favorable for the production of woven network structures, since the forming ability of metals in the completely recrystallized state is particularly great. It can be seen that the particle-annealed alloy according to example 1 has a significantly higher yield strength (Rp 0.2) and a significantly higher tensile strength (Rm) in comparison to comparative example 1 (alloy C44500, prior art). A wire produced from this alloy or another structure produced from this alloy therefore has a significantly greater resistance to plastic deformation and failure by fracture. In spite of the high strength values, the particle-annealed alloy according to example 1 is nonetheless distinguished by a satisfactory elongation at fracture of 40-50%, whereby a sufficiently high forming ability is provided for the production of wire meshes.

TABLE 2 mechanical properties and grain size of a particle-annealed alloy (example 1) and a particle-free alloy (comparative example 1) in the state 100% recrystallized by annealing 500° C., 3 hours

|  | Comparative example 1 CuZn28Sn1P0.02 | Example 1 CuZn28Sn1Fe0.25P0.2 |
|---|---|---|
| HV10 | 60 | 115 |
| 0.2%-yield strength (MPa) | 102 | 234 |
| Tensile strength (MPa) | 337 | 443 |
| Elongation at fracture (%) | 73.3 | 45.8 |
| Grain size (μm) | 55-60 | 10-15 |

As a result of the particles intercalated in the matrix, the grain growth is restricted during the recrystallization of the particle-annealed alloy according to example 1. The grain size of this alloy in the recrystallized state is thus significantly less than that of the comparative alloy according to comparative example 1 (alloy C44500), see Table 2. This causes a homogeneous forming behavior and prevents the formation of surface irregularities in strongly plastically deformed regions ("orange peel effect"). In addition, in particular in the case of structures having small dimensions in one or two dimensions (strip, plate, or wire), a small grain size is desirable to keep the mean number of the grains between two surfaces as large as possible. This increases the general resistance ability of the structures produced from the alloy.

As a result of the high content of chloride ions in seawater, an alloy having the main elements Cu and Zn is to be dezincification-resistant for use in maritime aquacultures. A rapid test is described in the norm ISO 6509 testing for dezincification resistance. This test was performed on the described samples according to Table 1. The results are shown in Table 3. It is shown that the particle-annealed variants, which contain both Fe and P, have a particularly low dezincification depth comparable with a particle-free alloy according to comparative example 1 (alloy C44500), if the ratio between P content and Fe content is greater than or equal to 0.3 (examples 1 and 2). In the case of comparative example 2, in which the ratio between P content and Fe content is only 0.03, in contrast, the dezincification depth is at a comparatively high level.

TABLE 3 maximum attack depths (μm) in the test on dezincification susceptibility according to ISO 6509 for different example alloys

|  | Comparative example 1 CuZn28Sn1P0.02 | Comparative example 2 CuZn30Sn1Fe0.6P0.02 |
|---|---|---|
| Maximum attack depth longitudinally (μm) | 10 | 368 |
| Maximum attack depth longitudinally (μm) | 6 | No dezincification recognizable |

To test the seawater resistance, sample plates of the particle-reinforced alloy according to example 1 and the particle-free alloy according to comparative example 1 (alloy C44500) were subjected to artificial seawater according to DIN 50907 in a test stand for 15 weeks. In this case, beakers were used, which were each filled with 1 liter of the artificial seawater. A flow speed of the artificial seawater of 0.2 m/s was set by magnetic stirrers. In each case, 4 sample plates of the dimensions of 45 mm×45 mm×1 mm were fastened under the water surface, at the waterline, and above the water surface. The artificial seawater was changed every seven days. From the weight loss of the samples during the experiment, a mean ablation rate was determined, wherein only the sample surface which was located under the water surface was considered. Before the weight determination after the end of the experiment, the layer made of corrosion products which was located on the samples was dissolved using citric acid, since this layer does not contribute to the strength of the material and therefore should not be considered with respect to the remaining load-bearing cross-sectional area. The result of the test is shown in Table 4 and indicates that the metal ablation rate of the particle-reinforced alloy according to example 1 is surprisingly even lower than that of the particle-free alloy according to comparative example 1 (C44500). In a subsequent judgment of the sample plates from the various positions with respect to the water surface in metallographic micrographs, no selective corrosion attack, for example, dezincification or intercrystalline corrosion, was established in the particle-reinforced alloy according to example 1 or in the particle-free alloy according to comparative example 1.

TABLE 4 average specific ablation rate (μm/d) in a 15-week corrosion experiment in moving artificial seawater according to DIN 50907, calculated from the weight loss of the samples. The metal proportion which participated in the buildup of a cover layer was intentionally included with the metal ablation.

|  | Comparative example 1 CuZn28Sn1P0.02 | Example 1 CuZn28Sn1Fe0.25P0.2 |
|---|---|---|
| Mean specific ablation rate (μm/a) | 21.7 | 14.1 |

The following come into consideration as metal objects a. nets, fabrics, meshes, or gratings, which are produced from wires, for example,
- rollable nets or fabrics having square meshes ("chain-link fencing"),
- rollable nets or fabrics having hexagonal meshes ("chicken wire"),
- animal-tight fencing,
- corrugated gratings or stamped gratings,
- welded gratings;

b. gratings which are produced from strip, for example, expanded metal;

c. rods or profiles, which are used as fastening elements or for stabilizing fabrics;

d. tubes for fastening elements, floats, supply lines, or disposal lines.

The invention claimed is:

1. A copper alloy consisting of, in wt. %:
51.8 to 84.0% Cu
15.5 to 36.0% Zn,
0.35 to 3.0% Sn,
0.12 to 1.5% Fe,
up to 1.0% P,
optionally 0.1 to 2.0% Al
optionally 0.1 to 1.0% Mn and 0.1 to 1.0% Co
optionally 0.01 to 1.0% As and 0.1 to 1.0% Sb
and unavoidable impurities,
wherein the microstructure comprises more than 95 vol. % of α-phase crystals, in which at least iron phosphides and/or iron are intercalated as precipitation particles, the ratio of P/Fe is [P]/[Fe]>0.25 and the alloy has a matrix with a mean grain size of less than 20 μm.

2. The copper alloy as claimed in claim 1, characterized by a content of 0.55 to 1.5% Fe.

3. The copper alloy as claimed in claim 1, characterized by a content of
0.7 to 1.5% Sn and
0.55 to 0.7% Fe.

4. The copper alloy as claimed in claim 1, characterized by a content of 21.5 to 36.0% Zn.

5. The copper alloy as claimed in claim 4, characterized by a content of 26.5 to 35.0% Zn.

6. The copper alloy as claimed in claim 1, characterized in that, for the ratio of the content of P, As, Sb and the content of Fe, Mn, Co, the following applies:
[P +As +Sb]/[Fe +Mn +Co] >0.25.

7. Nets, fabric, meshes, and gratings, which are produced from wires, rods, tubes, or from metal strips of the copper alloy as claimed in claim 1.

8. Rods, profiles, or profile tubes for fastening or stabilization and made from the copper alloy of claim 1.

9. Tubes or hollow profiles, which are used as fastening elements, floats, or supply lines and disposal lines and made from the copper alloy of claim 1.

10. The copper alloy as claimed in claim 1, characterized by a content of 0.24 to 1.5% Fe and the ratio of P/Fe is [P]/[Fe] ≥ 0.3.

* * * * *